(12) United States Patent
Stone et al.

(10) Patent No.: US 9,923,892 B1
(45) Date of Patent: Mar. 20, 2018

(54) ENHANCED AUTOMATIC RESPONSE CULLING WITH SIGNATURE GENERATION AND FILTERING

(71) Applicant: WhiteHat Security, Inc., Santa Clara, CA (US)

(72) Inventors: Robert Stone, Mountain View, CA (US); Tomasz Derylo, Blakeslee, PA (US)

(73) Assignee: WhiteHat Security, Inc., Santa Clara, CA (US)

( * ) Notice: Subject to any disclaimer, the term of this patent is extended or adjusted under 35 U.S.C. 154(b) by 277 days.

(21) Appl. No.: 14/041,699

(22) Filed: Sep. 30, 2013

Related U.S. Application Data

(60) Provisional application No. 61/835,342, filed on Jun. 14, 2013.

(51) Int. Cl.
*G06F 11/36* (2006.01)
*H04L 29/06* (2006.01)

(52) U.S. Cl.
CPC ...... *H04L 63/0876* (2013.01); *G06F 11/3668* (2013.01); *G06F 11/3688* (2013.01); *H04L 63/1433* (2013.01)

(58) Field of Classification Search
CPC ............. H04L 63/1433; H04L 63/1408; H04L 63/1425; G06F 21/57; G06F 21/577; G06F 11/3664; G06F 11/3668; G06F 11/3692
See application file for complete search history.

(56) References Cited

U.S. PATENT DOCUMENTS

| | | | | |
|---|---|---|---|---|
| 8,087,088 B1* | 12/2011 | Pennington | ......... | G06F 11/3692 709/206 |
| 8,281,401 B2* | 10/2012 | Pennington | ............. | G06F 21/53 713/194 |
| 8,370,929 B1* | 2/2013 | Pennington | ......... | G06F 11/3672 713/152 |
| 8,621,639 B1* | 12/2013 | Pennington | ......... | G06F 11/3692 380/30 |
| 8,863,280 B1* | 10/2014 | Pennington | ......... | G06F 11/3672 713/187 |
| 8,893,282 B2* | 11/2014 | Pennington | ............. | G06F 21/53 713/152 |
| 8,997,235 B2* | 3/2015 | De Barros | .......... | H04L 63/1433 726/25 |

(Continued)

*Primary Examiner* — Tae Kim
(74) *Attorney, Agent, or Firm* — Polsinelli PC

(57) ABSTRACT

A method of testing a web application, wherein a web application is a program that operates on a server and interacts with clients that access the program over a network, wherein further the web application accepts parameters that define results generated from the web application, the method comprising determining which web application uniform resource identifiers ("URIs") are used to access various web applications on a system, selecting a subset of less than all of the URIs for the common web, wherein the subset is selected at least in part independently of the order generated, performing a security scan on a first URI of the subset of URIs, comparing locality-sensitive hash ("LSH") signatures of responses to the first URI, determine if the differences between responses exceed a threshold and performing a security scan on a second URI of the subset if the responses exceed the threshold.

20 Claims, 5 Drawing Sheets

(56) References Cited

U.S. PATENT DOCUMENTS

| | | | |
|---|---|---|---|
| 2006/0195588 A1* | 8/2006 | Pennington | G06F 21/53 709/227 |
| 2006/0265190 A1* | 11/2006 | Hein | G06F 11/3414 702/186 |
| 2007/0033158 A1* | 2/2007 | Gopalan | G06F 19/20 |
| 2010/0088265 A1* | 4/2010 | Pohl | G06Q 30/02 706/46 |
| 2012/0047431 A1* | 2/2012 | Hauser | G06F 17/30911 715/241 |
| 2012/0284275 A1* | 11/2012 | Vadrevu | G06F 17/30864 707/738 |
| 2013/0055403 A1* | 2/2013 | Pennington | G06F 21/53 726/25 |
| 2013/0205397 A1* | 8/2013 | De Barros | H04L 63/1433 726/25 |
| 2013/0208978 A1* | 8/2013 | Ribnick | G01N 21/8914 382/159 |
| 2013/0290786 A1* | 10/2013 | Artzi | G06F 11/3676 714/32 |
| 2013/0322733 A1* | 12/2013 | Tarnowski | G06T 7/0004 382/141 |
| 2013/0332444 A1* | 12/2013 | Kondratova | G06F 17/30864 707/709 |
| 2015/0199357 A1* | 7/2015 | Hwang | G06F 17/30958 707/748 |

* cited by examiner

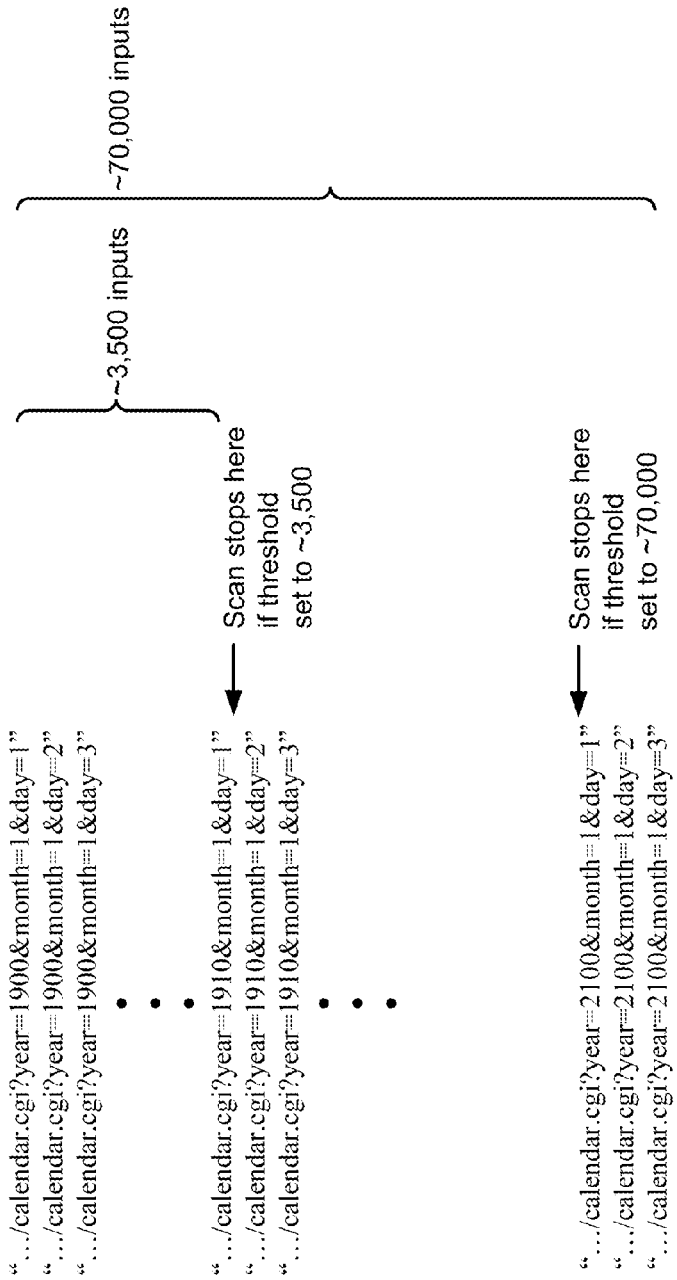

ENHANCED AUTOMATIC RESPONSE CULLING WITH SIGNATURE GENERATION AND FILTERING

BACKGROUND OF THE INVENTION

The present invention relates to network server security in general and in particular to web application security scanning in the case of infinite scan sites.

There are a number of different configurations of network client-server interfaces available today, but the most common network in use is the Internet, a global internetwork of networks and networks that use Internet protocols and/or interfaces, such as extranets, intranets, local services, and other variations. In the general case, to which inventions described herein apply, clients connect to servers over the network and clients are not always trusted computers. As a result, the designers of the servers need to ensure that untrusted clients cannot perform malicious acts or access unauthorized portions of the server through the network.

One approach to ensure that servers cannot be accessed in an unauthorized manner is to only provide access to secured and trusted clients. However, in many situations, that is not possible. For example, if a merchant was running an on-line store, the merchant would want to allow most anyone who has a computer to access the servers providing the on-line store functionality, but do so in a way that still prevents unauthorized interactions with the servers.

Server security is more than just requiring a username and password from each client before responding to client requests, since even a logged in user might try for unauthorized access and a typical service provided by a server might include content and functionality for use by unauthenticated and unlogged-in clients. One approach to server security is to review all of the code that runs on the server and verify that it does not include statements that allow for unauthorized activity and review all the files present on the server and their respective permissions, side-effects, etc. While this might be practical for a small installation, say a File Transfer Protocol ("FTP") server that serves up predefined files to all comers, it is often not practical with complex, interactive applications that have many response modes.

One common use of servers in this environment, but not an exclusive use, is that of a web application. As used herein, "web" refers to a collection of documents/files, some of which have references, or links, to other documents/files in the collection. One example of a web is the World Wide Web ("WWW"), a collection of files served up by WWW servers (also called "web servers") using Hypertext Transfer Protocol ("HTTP") protocols or something similar. The "WWW" gets its name from the fact that most of these documents/files can be almost anywhere in the world and can be accessed anywhere in the world where there is Internet connectivity.

A web application is an application that runs on one or more servers and provides some functionality or service in response to client requests received over a network using web protocols (i.e., HTTP, HTTP Secure ("HTTPS"), or something similar). An example of a web application is a database interface, wherein a database runs on a database system and clients can access data in that database system by sending a request for service over the network to a web application server. The web application server receives the request for service and decides, according to how it is programmed, what to do with the request. It can ignore the request, send an error message back to the client, or trigger an operation with the database system and respond to the client's request by sending the client the results of the database operation.

In a highly specific example, suppose a client computer system is operated by a customer seeking to configure and purchase a laptop computer. The customer would direct the client computer system to access a web application server operated by a vendor of laptop computers. The client computer system might send a request to the web application server via the network requesting a home page of the vendor. The web application server might respond with a home page that includes features allowing the client to interact with content on the home page (such as by selecting from available model names, features, etc.), send a subsequent request to the server, etc.

All the while, the web application server is making decisions about what is appropriate to send and what is not appropriate to send, based on its programming. For example, if the client computer sends a request for an updated page with updated pricing for new options selected by the customer, the web application server might perform some calculations, perform some database look-ups, generate a new dynamic web page and return that web page to the client computer in response to the request. However, if the client computer sends a request to see data about what someone else ordered, or internal data from the database server, the web application should properly refuse to respond to the request.

Because web applications are so complex and may involve a potentially infinite number of pages, securing a web application and testing for security vulnerabilities, often involves an automated testing of the web application. Client-side web application testing refers to tests that are run from a client's point of view. For example, a client-side web application security scanner might have logic for logging in to a web application, applying valid and invalid requests to the web application, noting the web application's responses and evaluating those responses. For example, if the web application security scanner sends a request to the web application for ordering products where the prices have been altered and the response is "invalid order", the web application security scanner might note that the web application is secure in that regard, but if the response is "thank you for your order", the web application security scanner might note that the web application is not secure.

Once vulnerabilities have been identified, they can be brought to the attention of a web application designer for handling. Of course, if vulnerabilities are missed by the automated web application security scanner, those vulnerabilities might never get fixed. Also, if there are too many false positives, the web application designer might give up on the web application security scanner or miss some true positives. In addition, if the web application includes a potentially infinite number of sites that require scanning, the web application security scanner may never cease operating. Furthermore, web application security scanners need to perform their tests in reasonable amounts of time to be useful.

In view of the above, the inventions described herein provide improvements over existing approaches.

BRIEF SUMMARY OF THE INVENTION

Embodiments of the present invention provide a method of testing a web application, wherein a web application is a program that operates on a server and interacts with clients that access the program over a network, wherein further the web application accepts parameters that define results generated from the web application, the method comprising determining which web application uniform resource identifiers ("URIs") are used to access various web applications on a system, selecting a subset of less than all of the URIs for the common web application, wherein the subset is selected at least in part independently of the order generated, performing a security scan on a first URI of the subset, comparing locality-sensitive hash ("LSH") signatures of responses to the first URI, determine if the responses exceed a threshold, the threshold used to establish a minimum difference between the responses and performing a security scan on a second URI of the selected subset if the responses exceed the threshold.

The following detailed description together with the accompanying drawings will provide a better understanding of the nature and advantages of the present invention.

BRIEF DESCRIPTION OF THE DRAWINGS

FIG. 3 is a diagram illustrating a method of sequentially generating a scan schedule for a specific web application with a calendar input functionality in accordance with embodiments of the invention.

DETAILED DESCRIPTION OF THE INVENTION

An improved web application security scanner is described herein. A web application security scanner exercises a web application to find vulnerabilities and/or functional errors. For example a scanner might identify files on a web application server that are accessible but should not be, errors in web application logic, vulnerabilities wherein the web application accepts altered or unexpected inputs instead of responding with an error message.

The examples herein are not intended to be exhaustive, but describe embodiments of the present invention. Where individual items are shown, multiple items might be present, unless otherwise indicated. Where an indefinite number of items are shown or described, such as by parenthetical references to (1), (2), . . . , (N), the actual number is not limiting, unless otherwise specified. It should be noted that, unless otherwise indicated, the domain names used in the examples are not intended to refer to actual domains and any similarity is merely coincidental.

Figure 1:
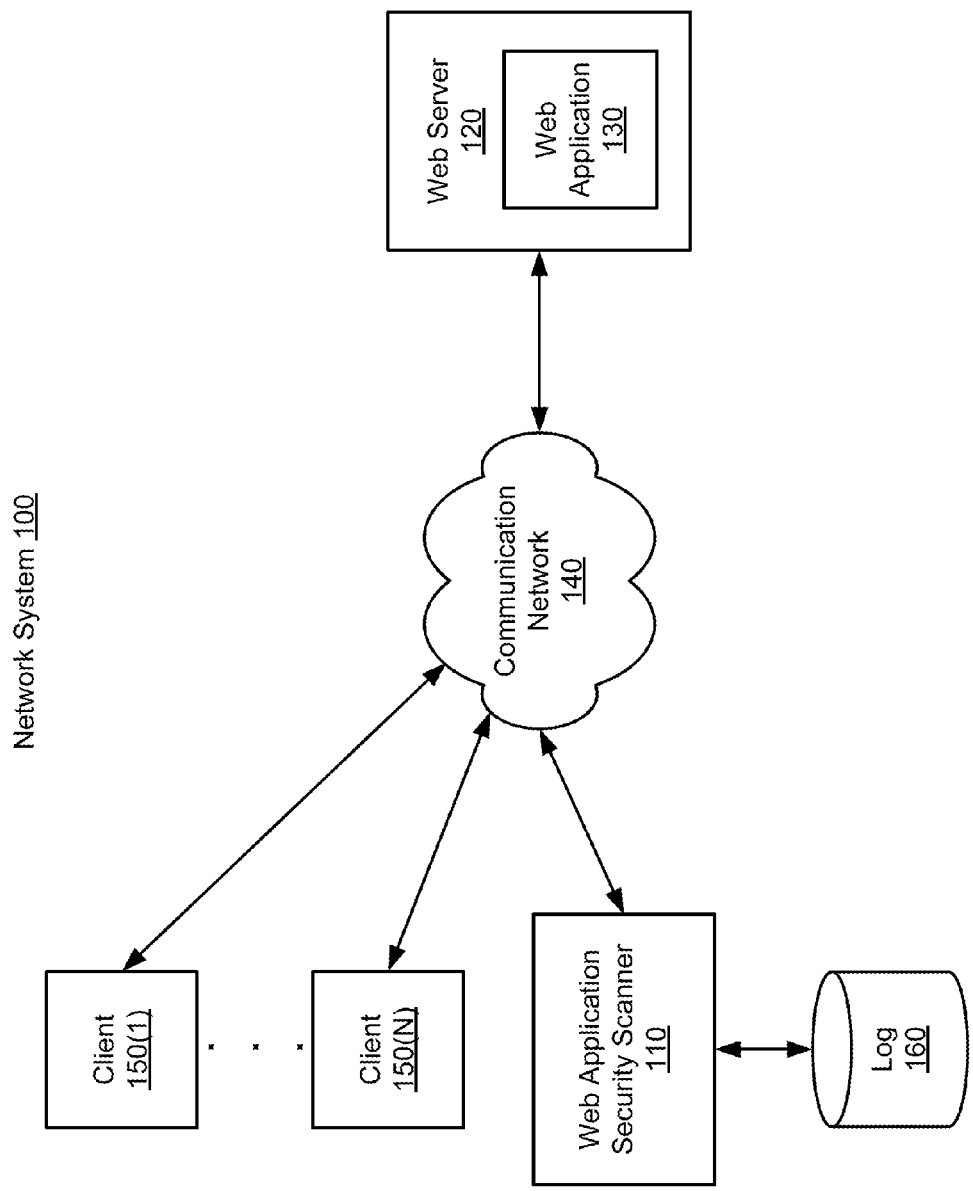
FIG. 1 is a high-level block diagram of a network employing a web application security scanner in accordance with embodiments of the invention.

FIG. 1 is a high-level block diagram of a network system 100 employing a web application security scanner 110. In one embodiment, as illustrated in FIG. 1, network system 100 includes web server 120 serving respective web application 130 to web application security scanner 110 via a communication network 140. The web application 130 may additionally be served by web server 102 to a plurality of clients 150 via the same communication network 140. Communication network 140 may be any network, such as the Internet, a local area network ("LAN"), a wide area network ("WAN"), a wireless network, a wire-line network, etc. Web application security scanner 110 is also connected to a database 160 to log all activities and results. While FIG. 1 illustrates a web application security scanner 110 that is configured to interact with a web application 130, the web application security scanner 110 may be configured to interact with multiple web applications at a time.

A web application security scanner may be configured to perform tests against a web application by sending client requests from a testing computer to the server running the web application and checking how the web application responds. The web application security scanner might include a spidering function, wherein the web application security scanner may be configured to begin with one or more entry points to the web application, uses those entry points, analyzes the responses to find more entry points, then tests those entry points, etc., in effect "walking along the web" of entry points. Where the entry points are web pages, each entry point might have an associated Uniform Resource Identifier ("URI") that identifies the entry point. By sending a request to the server that includes a URI, the server might respond by returning the web page "pointed to" by that URI. The returned web page might include links in the form of URIs pointing to other web pages, and so on.

URIs can be dynamic, wherein the page referenced by the URI does not exist until a request is made. For example, suppose a vendor can supply 1000 products and has information about those 1000 products in a database. In response to a client computer sending a URI indicating one of those products, the web application can generate a page with information about that product from the database and send the generated page to the client computer. Where the generated page represents, say, an order form in progress, there might be trillions of possible variations for the page. In most cases, a web application security scanner cannot generate URIs for all possible pages and make requests for all of those pages in a reasonable time. As a result, most web application testers need to rely on a sample test of all possible inputs.

Unattended website spidering gets examples of web site and web application usage to identify sample inputs and outputs of web applications. Where not all possible inputs can be run, the web application security scanner should run a good, representative sample.

Many web applications will generate an unbounded or exceedingly large number of response pages because their inputs are not tightly bounded. A web based calendar, for example, may be configured to show a schedule all the way back to the year zero or even further into the past, and well into the next century and beyond. Of the approximately 800,000 days between 0 A.D. to 2200 A.D., there are probably less than 1% that are interesting and relevant to the user of this application, so a web application security scanner should not test all 800,000 possible dates.

A spidering process for the purpose of web application testing can also benefit from spidering to a sampling of requests rather than every sampling in a complete set of requests. Once the spider has determined the ways this application can be called, and has a sample set of the kinds of output it produces, the value of further spidering diminishes.

In an embodiment, the web application security scanner may be configured to leverage Locality Sensitive Hash ("LSH") signatures for each response and, with carefully dialed in variables, accordingly decide when to retire such URIs based on pre-programmed logic. For instance, the web application security scanner may be configured to assign a numeric value representing a relative interest level associated with the given response by calculating how different this response is from previously received responses. If a response is highly similar to those already processed using the web application security scanner, then the web application security scanner may be configured to terminate use of the URIs triggering the response.

Figure 2:
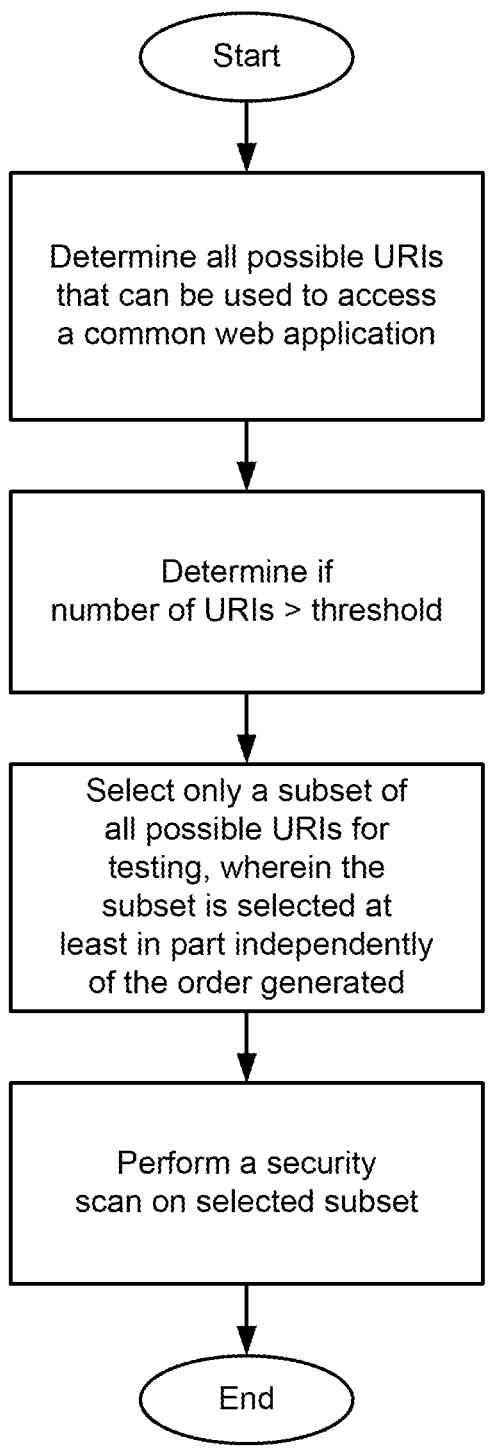
FIG. 2 is a flow diagram illustrating a method of providing for automatic response culling for web application security scan spidering process in accordance with embodiments of the invention.

FIG. 2 is a flow diagram illustrating how the above method of providing for enhanced automatic response culling with signature generation and filtering for web application security scan spidering processes may be implemented in accordance with embodiments of the invention.

Basic Implementation

In some embodiments, testing is performed by a web application security scanner acting as a client and sending HTTP requests to a web application server and judging the responses. In an HTTP Request, the URI portion traditionally contains several segments with agreed upon meanings, for example in the URI "http://www.<somesite>.com/cgi-bin/
calendar.cgi?year=1970&month=1&day=1"

The "http://www.<somesite>.com/cgi-bin/calendar.cgi" portion of the string is most likely interpreted as a selector for a specific web application. Everything after that string in the URI represents parameters to vary the output of the application. Where there are potentially infinite valid possible combinations for the parameter values, the web application security scanner can only be expected to run through and test a subset of all the possible values.

One process for selecting a subset is to count how many requests refer to the URI http://www.<somesite>.com/cgi-bin/calendar.cgi during a spidering process and limit the number of URIs being considered to some threshold number. This would be somewhat problematic in cases where the sample set that the application presents to the spidering process is in a non-random order. FIG. 3 illustrates how a scan schedule might be sequentially generated for a specific web application with such a calendar input functionality. For example, if the threshold were set to check only 3500 dates and the application started with Jan. 1, 1900, no dates after 1910 would get checked. In order for the checking to continue up to Jan. 1, 2100, the threshold would have to be increased to a much higher value of 70,000 dates.

One approach to avoiding the skew that such an approach would incur is to randomly or semi-randomly skip some of the earlier samples in the presented sequence. As used herein, random, semi-random, etc., include truly random, pseudorandom and other categorizations that have essentially the same effect as random. In a specific implementation, a rate of skipping samples is determined according to an exponential decay function that controls which URIs referencing the same web application in the sequence are processed by the system. An example would be where the PDF of the decay function follows the formula y=(½)**floor(x/32). Of course, other functions besides an exponential function could be used.

Another approach that may be used to avoid the skew that such an approach would incur is to leverage LSH signatures for each response to determine a relative interest level value for a given response. In a specific implementation, the web application security scanner may be programmed to calculate how different a response is from previously loaded ones. If the response is highly similar to those that have already been processed, then the response is less interesting and accordingly the web application security scanner may assign a lower relative interest value to that response. Accordingly, if the web application security scanner is configured such that a limit is imposed on the minimum difference between the response and previously received responses, the web application security scanner may retire the URIs being processed by the system and switch to a more interesting set of URIs that may result in very different responses.

The threshold minimum difference between the response and previously received responses may not be a universal value but may depend on many aspects of the web applications being tested. In an embodiment, the web application security scanner may be configured to start with a low threshold and gradually increase the threshold as the web crawl continues. This may enable a greater likelihood of good functional coverage of all areas of a site while ensuring that the web crawler always terminates.

Of course, in other embodiments, high values might represent low interest levels and the threshold being an upper bound rather than a lower bound.

In an embodiment, the web application security scanner may also be configured to use a bucket calculation in conjunction with the threshold calculation. The bucket calculation may be used to define the number of threshold values seen before the web application security scanner can suppress the current URI. For example, if the current threshold is "3" and the bucket is set to "20," the URI may not be suppressed until the web application security scanner receives at least 20 signatures with an LSH distance of 3. A user of the web application security scanner may be able to customize these parameters in order to match his or her testing requirements. A user may be a web security company that uses the web application security scanner to receive results which may be used to provide guidance to organizations that provide web applications for analysis.

Figure 4A:
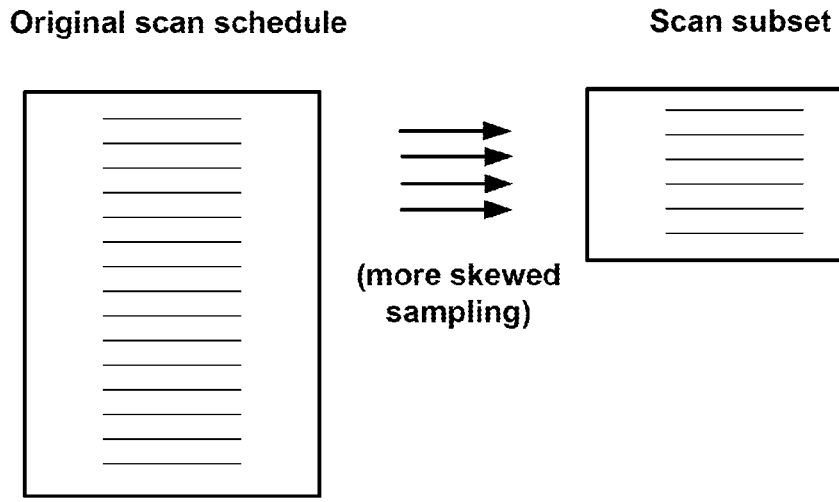
FIG. 4A is a diagram illustrating how generating a scan subset using the same order as the original scan schedule.

FIG. 4A is a diagram illustrating how generating a scan subset using the same order as the original scan schedule. By using the same order as the original scan schedule, the sampling may be more skewed. For example, as noted above in connection with FIG. 3, if the threshold were set to check only 3500 dates and the application started with Jan. 1, 1900, no dates after 1910 would get checked. Thus, sampling in this example may be skewed and potentially result in no unique responses or results throughout the subset.

Figure 4B:
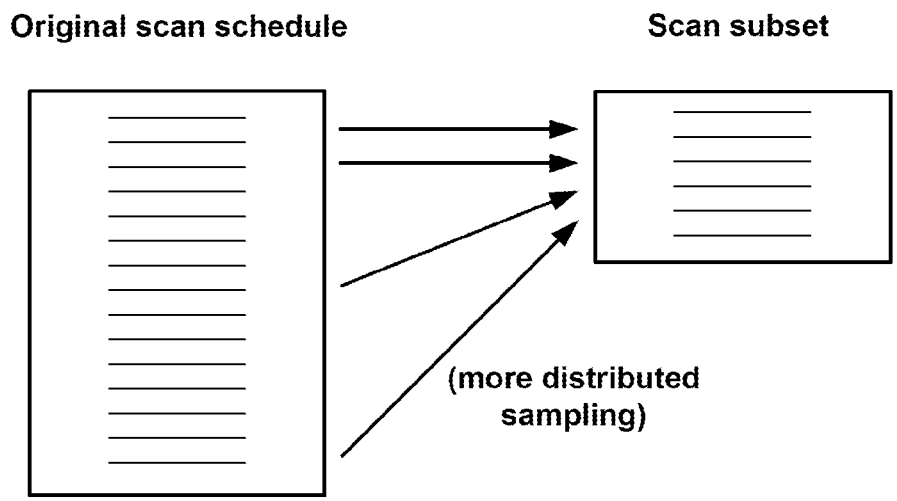
FIG. 4B is a diagram illustrating how selection of the scan subset through semi-random skipping would achieve a much more distributed sampling than if the selection of the scan subset was performed in the same order as the original scan list in accordance with embodiments of the invention.

FIG. 4B is a diagram illustrating how selection of the subset through semi-random skipping would achieve a much more distributed sampling than if the selection of the subset was performed in the same order as the original scan list.

Figure 5:
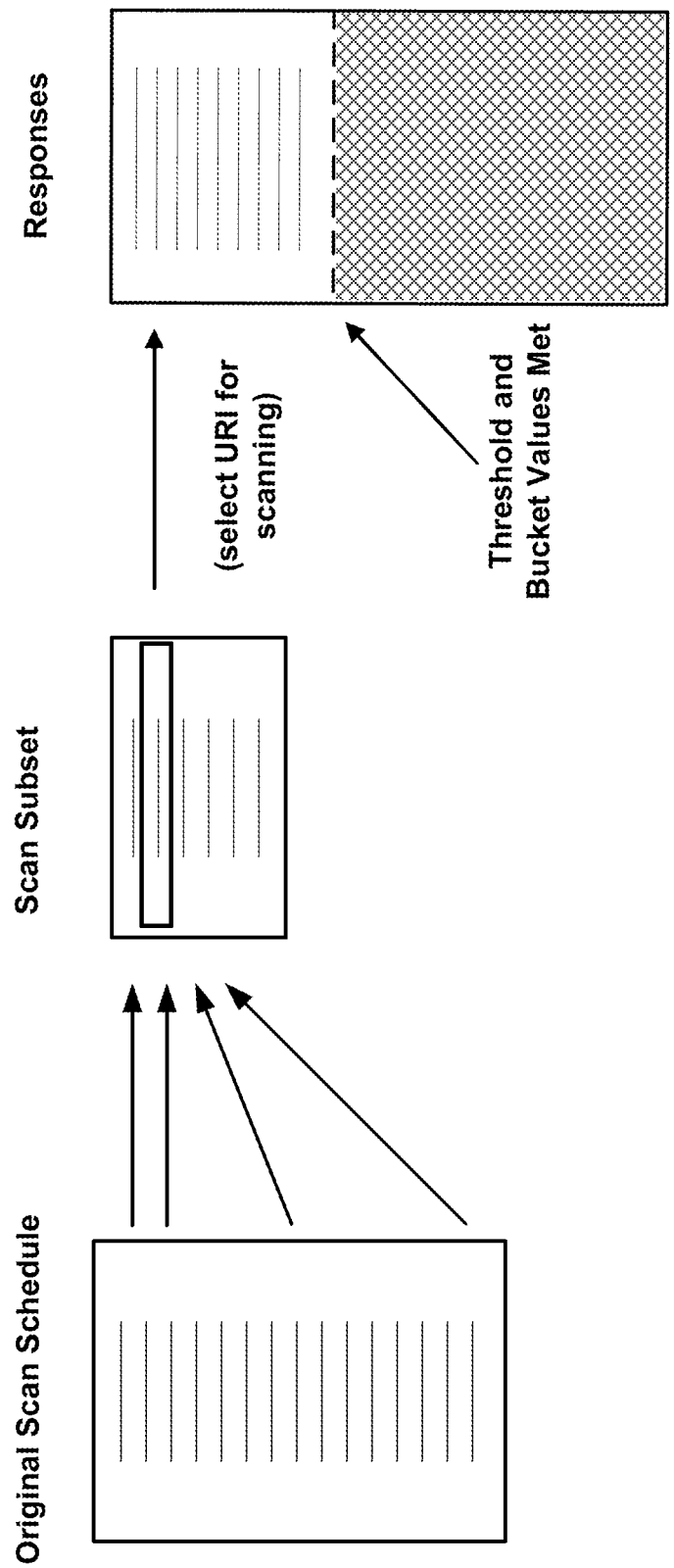
FIG. 5 is a diagram illustrating how selection of URIs based on threshold calculations would achieve greater functional coverage of all areas of a web application while ensuring that the web crawl will always terminate.

FIG. 5 is a diagram illustrating how selection of URIs based on threshold calculations would achieve greater functional coverage of all areas of a web application while ensuring that the web crawl will always terminate. The web application security scanner may be configured to select a URI for scanning Once this occurs, the URI may be used to elicit a set of responses. If the comparison of the responses results in the threshold and bucket values being met, the URI may be suppressed. Accordingly, the web application security scanner may be configured to select the new URI in the scan subset and repeat the process until all URIs in the subset have been scanned.

Alternative Implementation

In an HTTP Request, there are specific segments of the request that select which web application is to be called, and other portions that taken as parameters to that web application. A scanner according to embodiments presented here contains a profiler to identify which requests are calls to the same web application and what parameters are valid for each. After enough samples have been captured of a particular web application, the scanner might then choose to ignore any more examples discovered with increasing statistical likelihood.

One difference between the basic implementation and this alternative implementation is that the alternative provides a more flexible definition of how web applications are identified and allows for more powerful configuration of how references to web applications are selected as being excessive.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A method of testing a web application, wherein a web application is a program that operates on a server and interacts with clients that access the program over a network, wherein further the web application accepts parameters that define results generated from the web application, the method comprising:
    determining which web application uniform resource identifiers ("URIs") are used to access each of a subset of web applications on a system, each web application being operable to accept parameters that define results generated from the web application;
    selecting, for each web application of the subset of web applications, a subset of less than all of the URIs for the web application, wherein the subset is selected at least in part randomly and independently of the order the web application URIs were generated; and
    for each web application of the subset of web applications, executing electronic interactions with the web application, comprising:
        (a) performing a security scan on a first URI of the subset of URIs for the web application;
        (b) comparing locality-sensitive hash ("LSH") signatures of responses to the URI of the subset of URIs for the web application;
        (c) determining if a difference between the responses exceed a threshold, the threshold used to establish a minimum difference between the responses; and
        (d) performing a security scan on a second URI of the subset of URIs for the web application when the difference between the responses exceeds the threshold.

2. The method of claim 1, wherein selecting at least in part independently is selecting at least in part semi-randomly.

3. The method of claim 2, wherein determining which web application uniform resource identifiers (URIs) are used to access various web applications on a system comprises using a spidering process.

4. The method of claim 3, wherein selecting at least in part randomly is determined using an exponential decay function.

5. The method of claim 1, further comprising increasing the threshold if there is a minimum difference between the responses.

6. The method of claim 1, wherein determining if the difference between the responses exceed a threshold comprises determining if the difference between the responses exceed an LSH distance and a bucket value.

7. The method of claim 1, wherein the web application uniform resource identifiers (URIs) used to access various web applications on a system increases over time.

8. The method of claim 7, where the threshold increases when the web application URIs increase.

9. A computing device for testing a web application, wherein a web application is a program that operates on a server and interacts with clients that access the program over a network, the computing device comprising:
    a computer processor configured to read machine-readable instructions from a tangible, non-transitory computer-readable medium;
    the machine-readable instructions comprising:
        (a) program code for determining which web application uniform resource identifiers ("URIs") are used to access each of a subset of web applications on a system, each web application being operable to accept parameters that define results generated from the web application;
        (b) program code for selecting, for each web application of the subset of web applications, a subset of less than all of the URIs for the web, wherein the subset of URIs is selected in a manner that is partly randomly and independent of an order the web application URIs were generated;
        (c) program code for performing, for a first URI of the subset of URIs, a security scan on a first URI;
        (d) program code for comparing locality-sensitive hash ("LSH") signatures of responses to the first URI;
        (e) program code for determining if a difference between the responses exceed a threshold, the threshold used to establish a minimum difference between the responses; and
        (f) program code for performing security scan on a second URI of the subset of URIs when the difference between the responses exceed the threshold.

10. The computing device of claim 9, wherein selecting at least in part independently is selecting at least in part semi-randomly.

11. The computing device of claim 10, wherein determining which web application uniform resource identifiers (URIs) are used to access various web applications on a system comprises using a spidering process.

12. The computing device of claim 11, wherein selecting at least in part randomly is determined using an exponential decay function.

13. The computing device of claim 9, further comprising increasing the threshold if there is a minimum difference between the responses.

14. The computing device of claim 9, wherein determining if the difference between the responses exceed a threshold comprises determining if the difference between the responses exceeds an LSH distance and a bucket value.

15. A non-transitory computer-readable medium tangibly embodying a program of machine-readable instructions executable by a digital processing apparatus having stored thereon instructions configured to test a web application, the computer-readable medium being electronically readable comprising:

program code for determining which web application uniform resource identifiers ("URIs") are used to access each of a subset of web applications on a system, each web application being operable to accept parameters that define results generated from the web application;

program code for selecting, for each web application of the subset of web applications, a subset of less than all of the URIs for the web application, wherein the subset of URIs is selected in a manner that is partly randomly and independent of an order the web application URIs were generated;

program code for performing, for a first URI of the subset of URIs, a security scan including sending HTTP client requests to web applications and evaluating responses;

program code for comparing locality-sensitive hash ("LSH") signatures of the responses to the requests from the first URI;

program code for determining when a difference between the responses exceed a threshold, the threshold used to establish a minimum difference between the responses; and program code for performing, for a second URI of the subset of URIs, a security scan including sending HTTP client requests to web applications and evaluating responses.

16. The computer-readable medium of claim 15, wherein selecting at least in part independently is selecting at least in part semi-randomly.

17. The computer-readable medium of claim 16, wherein determining which web application uniform resource identifiers (URIs) are used to access various web applications on a system comprises using a spidering process.

18. The computer-readable medium of claim 17, wherein selecting at least in part randomly is determined using an exponential decay function.

19. The computer-readable medium of claim 15, further comprising increasing the threshold if there is a minimum difference between the responses.

20. The computer-readable medium of claim 15, wherein determining if the difference between the responses exceed a threshold comprises determining if the difference between the responses exceed an LSH distance and a bucket value.

* * * * *